No. 733,733. PATENTED JULY 14, 1903.
J. J. MULLIGAN.
DISTRIBUTER FOR SAND OR OTHER MATERIALS.
APPLICATION FILED DEC. 18, 1902.
NO MODEL.

WITNESSES:
Chas. D. King
A. C. Fischer

INVENTOR
John J. Mulligan
BY
Clifford E. Dunn
ATTORNEY

No. 733,733. Patented July 14, 1903.

UNITED STATES PATENT OFFICE.

JOHN J. MULLIGAN, OF NEW YORK, N. Y.

DISTRIBUTER FOR SAND OR OTHER MATERIALS.

SPECIFICATION forming part of Letters Patent No. 733,733, dated July 14, 1903.

Application filed December 18, 1902. Serial No. 135,819. (No model.)

*To all whom it may concern:*

Be it known that I, JOHN J. MULLIGAN, a citizen of the United States, residing at 364 Amsterdam avenue, in the city and State of New York, have invented certain new and useful Improvements in Distributers of Sand or other Materials, of which the following is a full, clear, and exact description.

In cities where asphalt and other smooth pavements are used great difficulty is often experienced, particularly in the winter time, through horses slipping and falling thereon; and my invention has for its object an apparatus for evenly distributing sand or other suitable material over the slippery surface in an effective but economical way.

Figure 1:
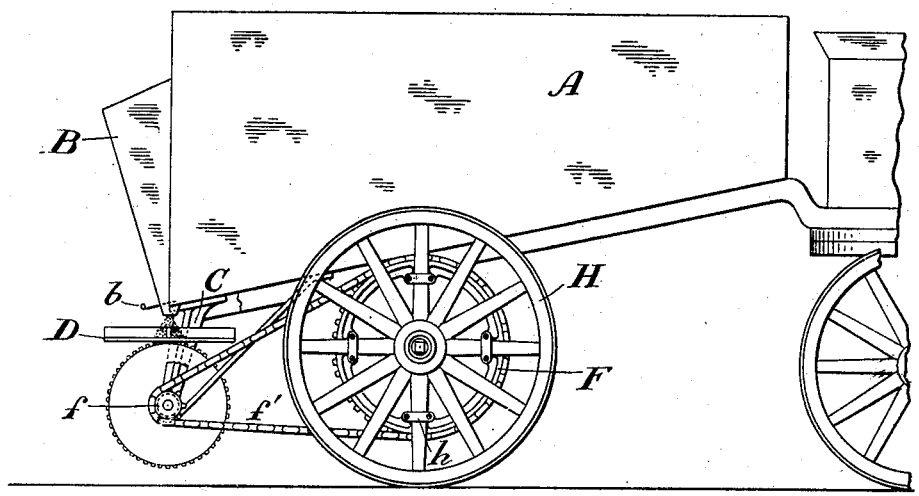
Figure 2:
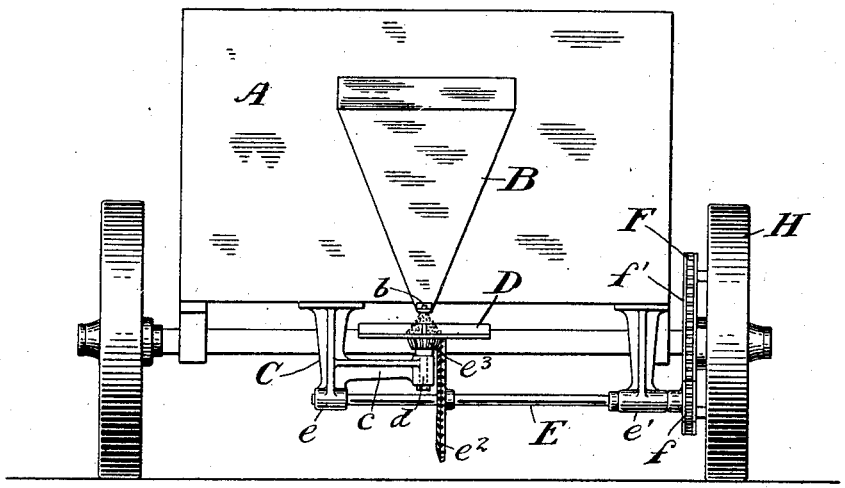
Figure 3:
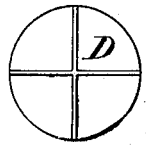

In the accompanying drawings, illustrating my invention, Figure 1 is a side view of a cart, showing my sand-distributing attachment affixed thereto. Fig. 2 is a rear view of the same, and Fig. 3 a top view of the sand-distributing disk.

In the drawings, A represents a cart having, preferably, an inclined floor whose lowest point is at the rear and where a hopper B is provided, having a feed regulator or shutter $b$. Immediately beneath the outlet of the hopper is mounted the revolving disk D, secured to the vertically-revolving shaft $d$, mounted in the arm $c$ of the frame C, which latter is bolted to the rear under side of the wagon.

E represents a shaft turning in bearings $e$ and $e'$, the latter being also secured to the rear under side of the wagon, and this shaft carries, rigidly secured thereto, the bevel-faced gear-wheel $e^2$, which engages a corresponding bevel-faced gear $e^3$ on the vertical shaft $d$. Upon the outer end of the shaft E is secured a small sprocket-wheel $f$, which is connected by a chain $f'$ with a large sprocket-wheel F, bolted, as shown at $h$, to one of the rear wheels of the wagon. The top of the revolving disk D is provided with crossed elevations which tend to give additional distributing power or capacity to the revolving disk.

The operation of the device is as follows: Sand or other gritty free-running material is put into the wagon and is fed through the hopper in a continuous but regulated stream upon the center of the revolving disk. When the wagon is started and the wheel H revolves, the gearings are set in motion, and by reason of the relative sizes of the gearings the disk D is given a very high speed as compared with the wheel H and the movement of the wagon, at least as much as one hundred to one. The sand flowing onto the rapidly-revolving disk is distributed by reason of the centrifugal force developed over a wide area and in an even and uniform manner. It is evident that the wagon need not be especially built for this purpose, but that the hopper and attendant mechanisms may be merely in the form of attachments which may be readily applied to any cart or wagon, a man being stationed therein to shovel the sand from the wagon into the detachable hopper. By means of the shutter or stop $b$ the flow of sand may be regulated as desired, and if a higher degree of speed is desired to be given to the disk D additional gearing may be interposed for that puspose.

Having thus described my invention, what I claim, and desire to secure by Letters Patent, is—

As an attachment to an ordinary wagon, a sand-distributing apparatus, comprising a detachable hopper, contracted at the lower end, a feed-regulator, in the lower part thereof, a centrifugal distributing-disk beneath said hopper, a T-shaped frame, a vertical shaft, upon which said disk is mounted, journaled in said frame and provided with a beveled gear, a horizontal shaft also journaled in said frame and likewise provided with a beveled gear, engaging the gear or the vertical shaft, and means connecting the horizontal shaft with one of the wheels of the wagon, substantially as described.

In testimony whereof I have hereunto affixed my signature in the presence of two witnesses.

JOHN J. MULLIGAN.

Witnesses:
CLIFFORD C. DUNN,
A. C. FISCHER.